United States Patent [19]

Ohgoda et al.

[11] Patent Number: 4,640,507
[45] Date of Patent: Feb. 3, 1987

[54] DEVICE FOR FEEDING AND POSITIONING RECORDING MEDIUM

[75] Inventors: Makoto Ohgoda; Kaoru Tamura, both of Kanagawa, Japan

[73] Assignee: Fuji Photo Film Co., Ltd., Kanagawa, Japan

[21] Appl. No.: 704,686

[22] Filed: Feb. 22, 1985

[30] Foreign Application Priority Data

Feb. 22, 1984 [JP] Japan .................. 59-31736

[51] Int. Cl.$^4$ .............................................. G03C 5/16
[52] U.S. Cl. .................. 271/245; 250/465.1; 378/167
[58] Field of Search ............ 271/245, 246, 226, 244, 271/249, 264, 8.1, 83, 84, 85; 378/167, 173; 250/465.1, 475.1

[56] References Cited

U.S. PATENT DOCUMENTS

| 4,201,919 | 5/1980 | Schmidt | 250/468 |
| 4,260,896 | 4/1981 | Schmidt | 250/468 |
| 4,282,439 | 8/1981 | Matsuura | 250/470 |
| 4,400,619 | 8/1983 | Kotera et al. | 250/327.2 |
| 4,408,339 | 10/1983 | Schmidt | 378/173 |

FOREIGN PATENT DOCUMENTS

| 068570 | 1/1983 | European Pat. Off. |  |
| 0011392 | 2/1981 | Japan . |  |
| 0012599 | 2/1981 | Japan . |  |
| 57-124 | 4/1983 | Japan | 378/167 |
| 0099432 | 6/1984 | Japan | 378/167 |

Primary Examiner—Douglas C. Butler
Assistant Examiner—Matthew C. Graham
Attorney, Agent, or Firm—Sughrue, Mion, Zinn, Macpeak & Seas

[57] ABSTRACT

A device for feeding and positioning a recording medium as in a radiographic apparatus includes a grip member for gripping, feeding, and positioning the recording medium therein, the grip member being composed of a first plate, a second plate disposed in confronting relation to the first plate and openable at least in an upper end portion thereof with respect to the first plate, and a cover member disposed for closing and opening a gap between lower ends of the first and second plates. The device also includes positioning means for holding the grip member with at least its upper end portion opened in a recording medium receiving position, for displacing the grip member after it has received the recording medium and closing the upper end portion thereof thereby to position the grip member so as to position the recording medium in an exposure position in the grip member, and for displacing the grip member after the recording medium has been exposed thereby to open the cover member for discharging the exposed recording medium out of the grip member.

13 Claims, 21 Drawing Figures

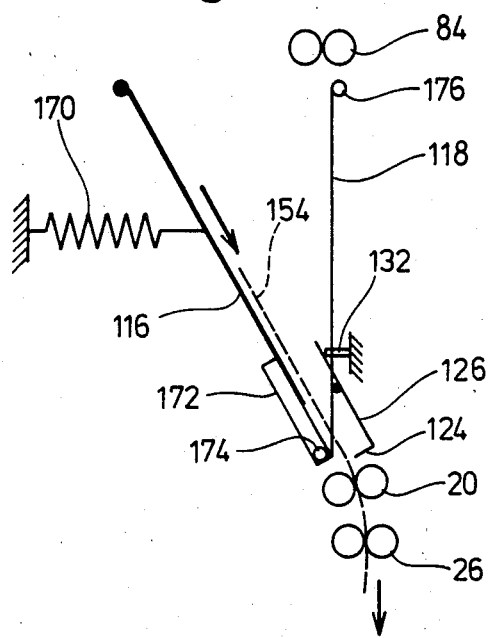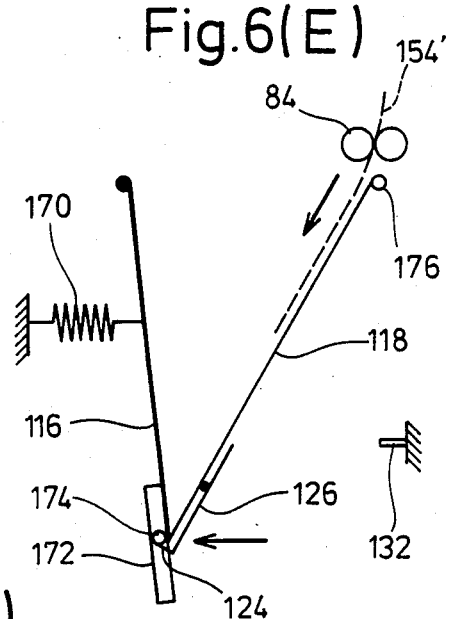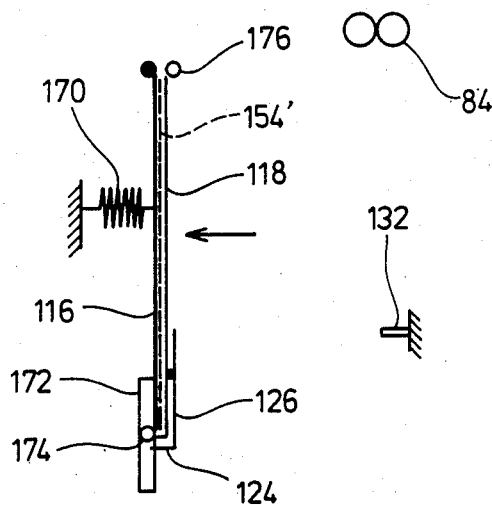

DEVICE FOR FEEDING AND POSITIONING RECORDING MEDIUM

BACKGROUND OF THE INVENTION

The present invention relates to a device for feeding and positioning a recording medium in a radiographic apparatus, and more particularly to a device capable of feeding a recording medium smoothly to an exposure unit, fixing the recording medium therein, and reliably feeding the exposed recording medium to a device for reading out radiation-image information in a so-called vertical radiographic apparatus.

Vertical radiographic apparatus form radiation images of substantially upstanding objects. The prior vertical radiographic apparatus operate by separating x-ray films supplied to a prescribed position one by one, feeding the x-ray film with rollers and endless belts to a front end plane of an exposure unit, namely an exposure plane which projects from the main body of the radiographic apparatus, and inserting and positioning the x-ray film between a pair of intensifying screens fixed at the exposure plane for exposure.

With the conventional radiographic apparatus, however, the x-ray films are fed by the rollers and the endless belts along a path having a small radius of curvature and extending from the main body of the radiographic apparatus to the exposure unit and also extending in a region where the x-ray film is to be inserted between the intensifying screens. Therefore, the x-ray film as it passes through such a path is subjected to a strong bending stress, which is not preferable.

The rollers and the endless belts are disposed in the vicinity of each of upper and lower portions of the exposure unit for feeding the x-ray film from the main body of the radiographic apparatus to the exposure plane of the exposure unit and then withdrawing the exposed x-ray film from the exposure plane. These rollers and endless belt have made the exposure unit large in size.

The radiographic apparatus includes a jaw rest positioned upwardly of the exposure unit for supporting the jaw of a patient to allow him to be x-rayed in an upstanding position. Since the rollers and the endless belt are disposed within the exposure unit near its upper end, however, the distance from the jaw rest to a leading end of the x-ray film in the exposure position is increased to thereby limit an effective exposure region, so that a body area which can be x-rayed is restricted.

There has in recent years been proposed a system in which a radiation image is reproduced by storing radiation image information temporarily in a sheet comprising a so-called stimulable phosphor, scanning the sheet by stimulating rays to cause the stimulable phosphor carrying the radiation image information stored therein to emit light in proportion to the radiation energy stored, detecting the emitted light and converting it into an electric signal for image reproduction (see U.S. Pat. Nos. 4,258,264, 4,276,473, and 4,315,318, for example).

The stimulable phospor in the proposed system is a provisional recording medium for temporarily storing radiation image information. The stimulable phospor can repeatedly be used by discharging any residual radiant energy after the radiation image information has been read, according to a process shown in U.S. Pat. No. 4,400,619, Japanese Laid-Open Patent Publication Nos. 56-11392 or 56-12599, for example.

Therefore, the vertical radiographic apparatus in the foregoing radiation image information recording and reproducing system should preferably comprise a radiation image information recording and read out apparatus composed of read out means for reading radiation image information stored in the stimulable phosphor sheet and erase means for discharging any residual radiant energy from the stimulable phosphor sheet. It is preferable for the stimulable phosphor sheet or provisional recording medium to be capable of repeated use in the radiation image information recording and read out apparatus.

The upstanding radiation image information recording and read out apparatus constructed to meet the above demands will suffer from a greater problem when a strong bending stress is imposed on the stimulable phosphor sheet than when a strong bending stress is applied to the x-ray film because the stimulable phosphor sheet is thicker and much more rigid than the x-ray film. The problem of bending of the stimulable phosphor sheet is of much importance since it is supposed to be used many times unlike the x-ray film.

SUMMARY OF THE INVENTION

It is an object of the present invention to provide a device for feeding and positioning a sheet-like recording medium reliably in an exposure position with a simple mechanism without imposing a strong bending stress on the recording medium and without limiting a body area that can be photographed or x-rayed.

Another object of the present invention is to provide a device for feeding and positioning a recording medium, comprising a gap member for gripping, feeding, and positioning the recording medium therein, the grip member being composed of a first plate, a second plate disposed in confronting relation to the first plate and openable at least in an upper end portion thereof with respect to the first plate, and a cover member disposed for closing and opening a gap between lower ends of the first and second plates, and positioning means for holding the grip member with at least its upper end portion opened in a recording medium receiving position, for displacing the grip member after it has received the recording medium and closing the upper end portion thereof thereby to position the grip member so as to position the recording medium in an exposure position in the grip member, and for displacing the grip member after the recording medium has been exposed thereby to open the cover member for discharging the exposed recording medium out of the grip member.

Still another object of the present invention is to provide a device for feeding and positioning a recording medium, in which the positioning means includes a pin member for opening the cover member, the pin member being positioned for abutting against the cover member to open the cover member when the grip member is displaced from the exposure position.

A still further object of the present invention is to provide a resilient member connected to the cover member for normally urging the cover member in a direction to close the grip between the lower ends of the first and second plates.

A yet further object of the present invention is to provide a device for feeding and positioning a recording medium, in which the first plate has an upper end portion engaged in the exposure position and is displaceable between the recording medium receiving position and the exposure position on rotation about the engaged upper end portion.

A still yet further object of the present invention is to provide a device for feeding and positioning a recording medium, in which the positioning means comprises a motor, and a crank mechanism for displacing the second plate in response to rotation of the motor.

Still another object of the present invention is to provide a resilient member coupled to the first plate or the second plate for normally urging the first plate or the second plate toward the exposure position.

A still further object of the present invention is to provide a device for feeding and positioning a recording medium, in which the resilient member coupled to the first plate or the second plate doubles as the resilient member connected to the cover member.

A still further object of the present invention is to provide a resilient member coupled to the first plate or the second plate for normally urging the first plate or the second plate toward the exposure position, the positioning means comprising means for translating and angularly displacing the second plate while the first plate or the second plate is urged by the resilient member to the exposure position.

Yet another object of the present invention is to provide a device for feeding and positioning a recording medium, in which the second plate has a rod projecting in the vicinity of a lower end thereof, the first plate having a guide member disposed in the vicinity of a lower end thereof and slidable in engagement with the rod.

A yet further object of the present invention is to provide a resilient member acting between the first and second plates for normally urging them toward each other, the positioning means comprising means for translating the grip member.

A still yet further object of the present invention is to provide a guide member disposed between the first and second plates for engaging both side edge portions of the recording medium to guide the recording medium.

Still another object of the present invention is to provide a device for feeding and positioning a recording medium, in which the first plate and/or the second plate has on a confronting surface thereof a thin layer of foamed polyethylene.

A still further object of the present invention is to provide a device for feeding and positioning a recording medium, incorporated in a radiation image information recording and read out apparatus.

A recording medium referred to in the present invention may comprise a sheet-like material capable of temporarily or permanently storing and recording radiation image information, such a sheet-like material including an x-ray radiographic film or a stimulable phosphor sheet.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 6(A) through 6(F) are schematic diagrams showing operation of still another embodiment of the present invention.

DESCRIPTION OF THE PREFERRED EMBODIMENTS

A device for feeding and positioning a recording medium according to the present invention will now be described with reference to preferred embodiments thereof as incorporated in a radiation image information recording and read out apparatus.

Figure 1:
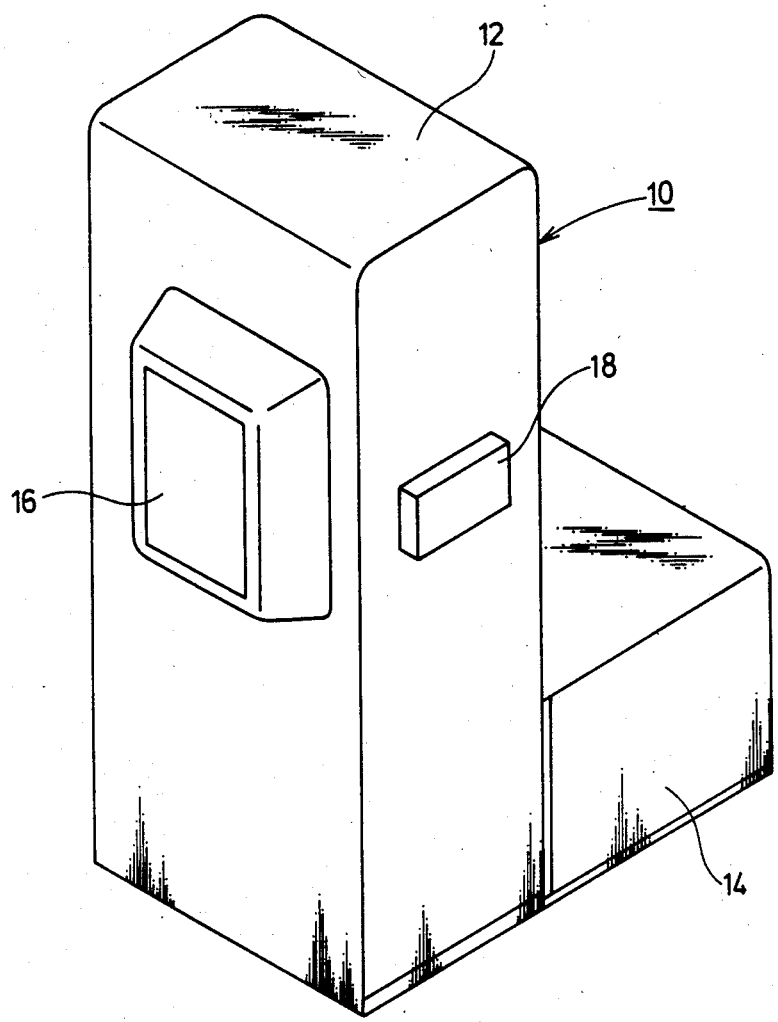
FIG. 1 is a perspective view of an upstanding radiation image information recording and read out apparatus in which a device according to the present invention is incorporated.

The reference numeral 10 in FIG. 1 denotes an upstanding radiation image information recording and read out apparatus including a first vertical housing 12 and a second horizontal housing 14. The first housing 12 supports an exposure unit 16 on a front upper portion thereof and a control unit 18 on a side upper wall thereof.

Figure 2:
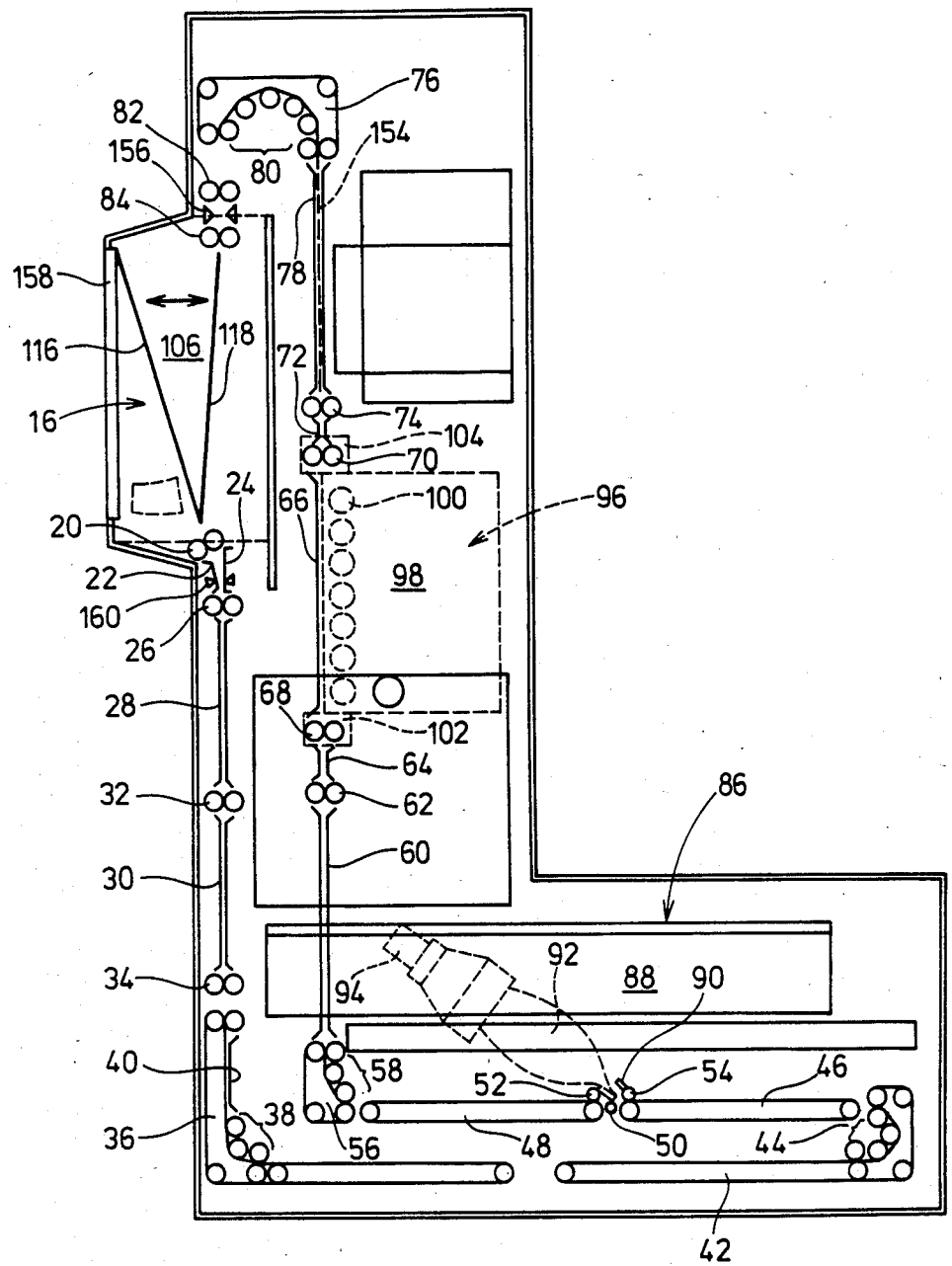
FIG. 2 is a side elevational view of the device of the invention, an exposure unit, a read out unit, and an erase unit of the radiation image information recording and read out apparatus.

The arrangements in the first and second housings 12, 14 will be described with reference to FIG. 2. A pair of reception rollers 20 is disposed below the exposure unit 16, the reception rollers 20 being slightly deviated off a vertical direction and held in pressing contact with each other. Below the roller pair 20, there are disposed a first inclined guide member 22 and a second guide member 24 confronting the first guide member 22 and extending in the vertical direction. Another pair of rollers 26 is positioned beneath the first and second guide members 22, 24. A pair of confronting third guide members 28 is located beneath the roller pair 26, the third guide members 28 being elongate but slightly shorter than a stimulable phosphor sheet (described later). Still another pair of rollers 32 is disposed between the third guide members 28 and a pair of confronting fourth guide member 30 located therebelow. A roller pair 34 is positioned downwardly of the fourth guide members 30.

A first endless feed belt 36 is disposed beneath the roller pair 34 and has an angularly bent configuration at an inner corner of the first housing 12. A first group of the rollers 38 is held against the inner bent portion of the feed belt 36 and located beneath a fifth guide member 40. The feed belt 36 terminates at a lower central portion of the second housing 14.

A second endless feed belt 42 is disposed in slightly spaced relation to a terminal end of the first feed belt 36. The second feed belt 42 is angularly bent in an upward direction at an inner corner of the second housing 14. A second group of four rollers 44 is held against the inner bent portion of the second feed belt 42. A pair of third and fourth endless feed belts 46, 48 extends horizontally in slightly spaced relation to a terminal end of the feed belt 42. The third and fourth feed belts 46, 48 are spaced a distance from each other with a small-diameter roller 50 being rotatably positioned therebetween. Rollers 52, 54 are positioned on and held against upper runs of the feed belts 46, 48 for reliably holding a stimulable phosphor sheet as it is fed along in coaction with the small-diameter roller 50. A fifth endless belt 56 bent upwardly is located in the vicinity of a terminal end of the fourth feed belt 48. A third group of three rollers 48 is held against a surface of the belt 56.

The fifth feed belt 56 and the third roller group 58 are located beneath a pair of confronting fifth guide members 60 disposed below a pair of confronting six guide members 64 with a pair of confronting rollers 62 interposed therebetween. The sixth guide members 64 are shorter than the fifth guide members 60. A seventh guide member 66 is disposed above the sixth guide members 64 and disposed between roller pairs 68, 70 located downwardly and upwardly of the seventh guide member 66 such that the distance between the roller pairs 68, 70 is slightly smaller than the vertical length of a stimulable phosphor sheet to be fed along.

A pair of rollers 74 is disposed above the rollers 70 with an intervening pair of eighth short guide members 72. Between the roller pair 74 and a next endless feed belt 76, there is positioned a pair of ninth guide members 78 having the same length as that of the fifth guide members 60.

The endless feed belt 76 is located closely to terminal ends of the ninth guide members 78 and has a bent configuration. The endless feed belt 76 is positioned substantially in a top portion of the first housing 12. A fourth group of sixth rollers 80 is held against an inner or lower run of the endless feed belt 76, the sixth rollers 80 being arranged substantially on one semicircular arc.

Pairs of rollers 82, 84 are disposed beneath the feed belt 76 and the fourth roller group 80.

The feed system for a stimulable phosphor sheet has the above basic construction in the radiation image information recording and read out apparatus 10. The feed system is related to a read out unit, an erase unit, and the exposure unit in the apparatus 10, which will hereinafter be described.

The read out unit, generally denoted at 86, will first be described. The read out unit 86 is basically composed of a laser beam source 88, a scanning optical system, not shown, including a galvanometer mirror for scanning a laser beam emitted from the laser beam source 88 over a sheet, a reflecting mirror 90 for collecting light, and a light guiding optical element 92 for effectively collecting part of stimulated light emitted from the sheet by the scanning laser beam and stimulated light reflected by the reflecting mirror 90. A photomultiplier 94 is mounted on the top of the light-guiding optical element 92.

The erase unit, generally designated at 96, has a casing 98 disposed in confronting relation to the guide member 66 and containing a group of erase lamps 100 comprising a number of light sources such for example as fluorescent lamps. Preferably, upper and lower sheet inlet and outlet ports of the casing 98 and the guide member 66 and the roller pairs 68, 70 are surrounded by light shield members 102, 104 for preventing light emitted by the erase lamp group 100 from adversely affecting a stimulable phosphor sheet which has been exposed.

Figure 3:
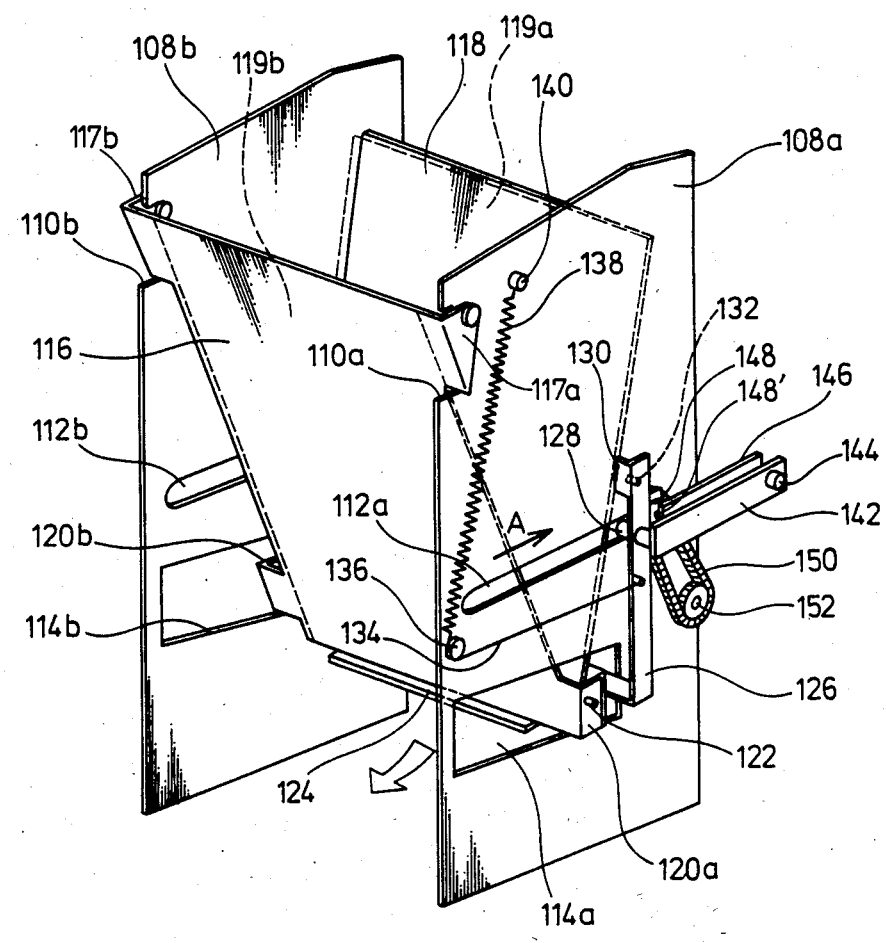
FIG. 3 is a perspective view of an embodiment of the device of the invention.

The exposure unit 16 will be described with reference to FIGS. 2 and 3.

The exposure unit 16 projecting laterally from the first housing 12 has an internal space 106 in which a pair of side plates 108a, 108b are fixedly mounted in spaced-apart relation from each other. The plates 108a, 108b have respective recesses 110a, 110b defined in upper front edges thereof, oblong holes 112a, 112b defined below the recesses 110a, 110b and extending horizontally, and substantially rectangular holes 114a, 114b defined below the oblong holes 112a, 112b, respectively.

A pair of first and second plates 116, 118 made of plastic reinforced with carbon fibers is disposed in the space between the plates 108a, 108b. The plates 116, 118 may be of a material capable of passing radiation uniformly therethrough, such as plastic or aluminum. The plates 116, 118 should preferably be coated with layers 119a, 119b of foamed polyethylene for effectively introducing, positioning, and discharging a stimulable phosphor sheet, described later. It is also possible to attach a lead sheet to the second plate 118 for effective prevention of radiation scattering. The plate 116 has opposite upper bent edges 117a, 117b extending through the recesses 110a, 110b, respectively, and pivotably mounted on upper end portions of the plates 108a, 108b. The plate 116 also has tongues 120a, 120b near a lower end thereof which extend respectively through the holes 114a, 114b out of the plates 108a, 108b.

The lower end of the plate 116 engages the plate 118 through a shaft 122 so that the upper ends of the plates 116, 118 can be opened and closed. More specifically, there is a clearance space between the plates 116, 118 which is wide enough to allow the stimulable phosphor sheet to pass therethrough, the clearance space being closeable by a lower cover 124. The lower cover 124 is coupled to lower cover arms 126 at positions outside of the plates 108a, 108b. The lower cover arms 126 have upper portions displaceably supported by shafts 128 slidable in the oblong holes 112a, 112b. Each of the lower arms 126 has at its an upper end a tongue 130 engageable with a lower cover opening and closing pin 132 projecting outwardly from the plate 108a on the movement of the tongue 130 in the direction of the arrow A (FIG. 3). The lower cover arm 126 has a hole defined below the shaft 128. A wire 134 has one end fastened in the hole in the lower cover arm 126 and an opposite end connected via a pin 136 to a coil spring 138 having an end attached to a pin 140 mounted on the plate 108a.

A first crank arm 142 has one end pivotably supported on the shaft 128 and is disposed outwardly of the lower cover arm 126. The opposite end of the first crank arm 142 is coupled by a shaft 144 to an end of a second crank arm 146 having an opposite end joined by a shaft 148' to a first sprocket 148 rotatably supported on the plate 108a. A chain 150 is trained in mesh around the first sprocket 148 and also around a second sprocket 152 coupled directly to the drive shaft of a drive motor, not shown.

Although not described specifically, the same mechanism as described above is provided on the other plate 108b.

Operation and advantages of the device will be described hereinbelow with particular reference to FIGS. 4(A) through 4(D). Throughout FIGS. 4 thrugh 7, black dots indicate fixed elements while white dots indicate movable elements.

A stimulable phosphor sheet 154 from which stored radiation image information has been erased by the erase light group 100 in the erase unit 96 is fed by the roller pairs 70, 74 through the guide members 78 to the feed belt 76 and the roller group 80. The sheet 154 is then gripped by the feed belt 76 and the roller group 80 and fed along a curved path until the sheet 154 reaches the roller pairs 82, 84. At this time, arrival of the sheet 154 can easily be confirmed by a first sensor 156 disposed between the roller pairs 82, 84. Then, the non-illustrated drive motor is energized to displace the plate 118 to the position of FIG. 4(A) under the action of the crank arms 142, 146 and the coil spring 138. The plates 116, 118 are now angularly moved about the shaft 122 so that the upper ends of the plates 116, 118 are spread apart. At this time, the lower cover 124 is in a closed position. The stimulable phosphor sheet 154 droips into a grip member composed of the plates 116, 118 and is engaged by the lower cover 124.

The non-illustrated drive motor is continuously driven to extend the crank arms 142, 146 until the plates 116, 118 are positioned most closely to each other and stopped. The sheet 154 supported on the lower cover 124 is held in confronting relation to an exposure plane 158 (FIG. 2) with the thin plate 116 interposed, and is gripped and positioned firmly by the plates 116, 118 (FIG. 4(B)). The sheet 154 can then effectively be positioned by the foamed polyethylene layers attached to the plates 116, 118 since the foamed polyethylene layers have soft surfaces of a suitable coefficient of friction held in contact with the sheet 154 while preventing the surfaces thereof from being damaged.

In this position, the sheet 154 is exposed to a radiation passing through an object, not shown, to have a radiation image stored therein.

Figure 4A:
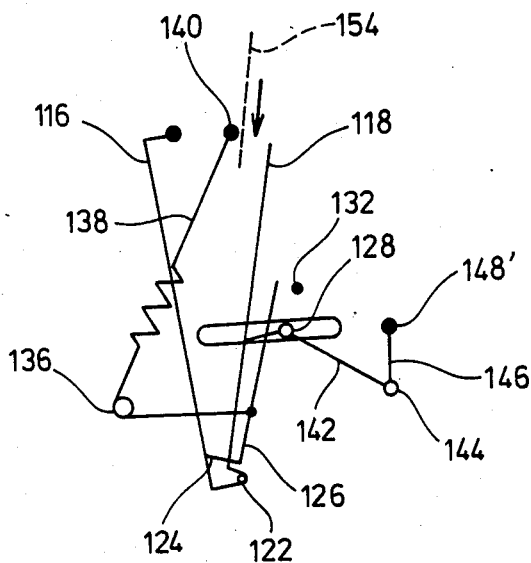
FIGS. 4(A) through 4(D) are schematic diagrams showing operation of the embodiment of FIG. 3.
Figure 4B:
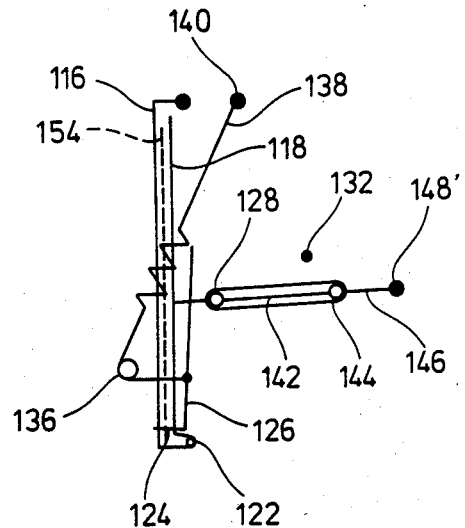
Figure 4C:
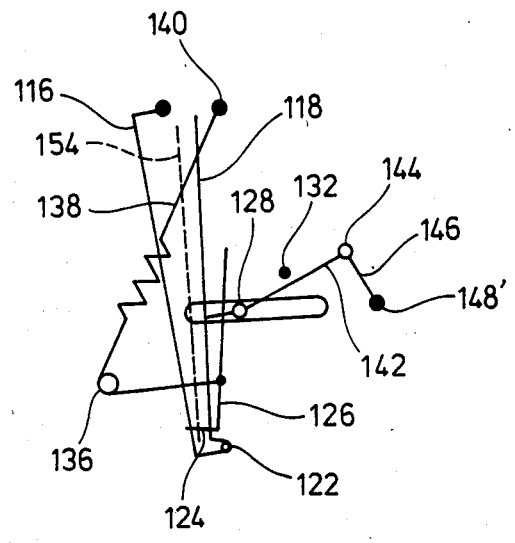
Figure 4D:
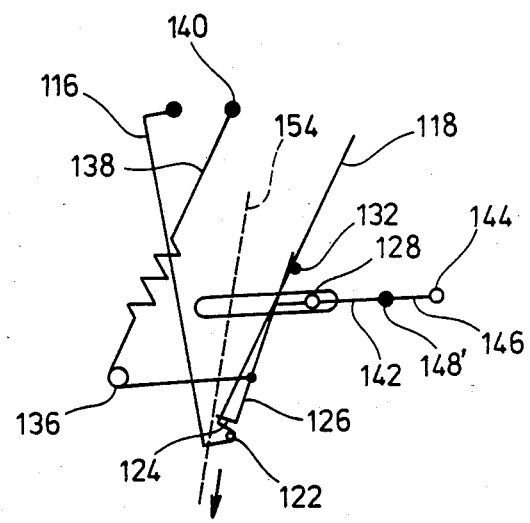

After the exposure, the drive motor is energized again to displace the plates 116, 118 through the position of FIG. 4(C) to the position of FIG. 4(D). In the position of FIG. 4(D), the pin 132 abuts against the tongue 130 of the lower cover arm 126, which is then caused to turn about the shaft 128. The lower cover 124 which has closed the gap between the lower ends of the plates 116, 118 is now opened to allow the exposed sheet 154 to drop and be caught by the roller pair 20 (FIG. 2). The falling of the sheet 154 can easily be detected by a second sensor 160 disposed between the roller pairs 20, 26.

The exposed sheet 154 is then delivered through the guide members 28, the roller pair 32, and the other components to the read out unit 86. In the read out unit 86, the exposed sheet 154 is scanned with a laser beam emitted from the light source 88 and the light emitted from the sheet 154 upon stimulation thereof by the laser beam enters the light guiding optical element 92. The light is guided inside of the light guiding optical element 92 through total reflection and detected by a photomultiplier 94 which is mounted on the top of the light guiding optical element 92. Thus, the radiation image information of the object is read out.

Figure 5A:
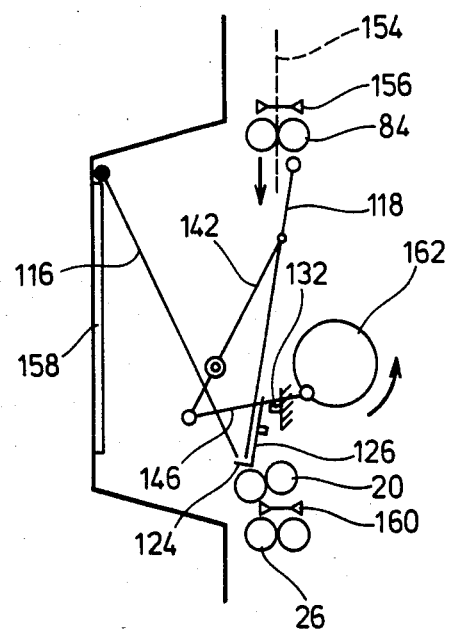
FIGS. 5(A) through 5(C) are schematic diagrams illustrating operation of another embodiment of the present invention.
Figure 5B:
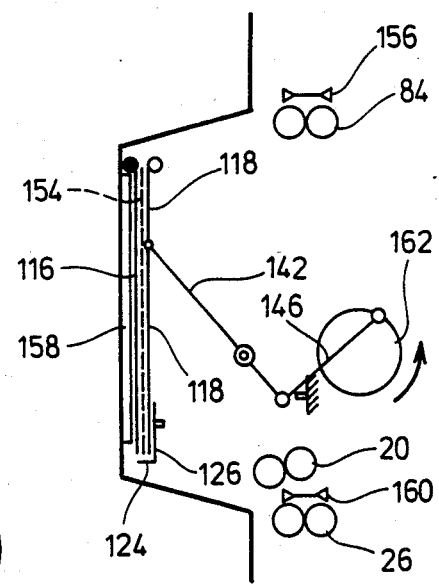
Figure 5C:
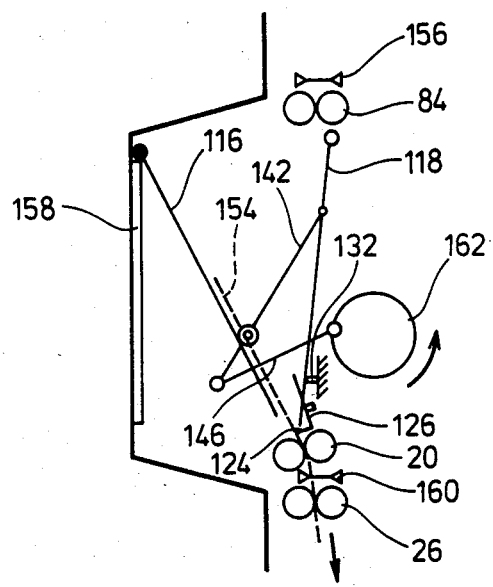

FIGS. 5(A) through 5(C) show another embodiment of the device for feeding and positioning a recording medium according to the present invention. Identical reference numberals in FIGS. 5(A) through 5(C) denote identical components of the preceding embodiment.

In the embodiment shown in FIGS. 5(A) through 5(C), the chain 150 and the sprockets 148, 152 are not employed, but the second crank arm 146 is directly coupled to an eccentric drive shaft of a motor 162.

In operation, the motor 162 is energized to displace the plate 118 to the position of FIG. 5(A) under the action of the crank arms 142, 146. The upper end of the plate 118 is then moved by the crank arms 142, 146 to a position immediately below a righthand roller of the roller pair 84 in FIG. 5(A). Therefore, the sheet 154 having passed through the roller pair 84 is slid on the inner surface of the plate 118 and then engaged by the lower cover 124. The lower cover 124 is normally urged by a spring, not shown, to a closed position. Therefore, the lower cover 124 is not held against the pin 132, but closes the gap between the lower ends of the plates 116, 118 through its bent configuration.

On continued rotation of the motor 162, the plate 118 is displaced by the crank arms 142, 146 toward the exposure plane 158 and then moved on while pushing the plate 116. Accordingly, the stimulable phosphor sheet 154 with its lower edge supported by the lower cover 124 is displaced while being gripped by the plates 116, 118 to a position in which the sheet 154 confronts the exposure plane 158 with the thin plate 116 interposed (FIG. 5(B)). In this position, the sheet 154 is exposed.

The motor 162 remains de-energized during exposure. After the exposure, the motor 162 is energized again to operate the crank arms 142, 146 to move the plates 116, 118 to the position shown in FIG. 5(C). More specifically, the rotation of the motor 164 raises the end of the crank arm 146 to an uppermost position and then lowers the same to move the crank arm 142 away from the position closest to the exposure plane 158. This causes the plate 118 to swing away from the exposure plane 158. As a consequence, the upper ends of the plates 116, 118 are spaced apart from each other, and the lower cover 124 engaging the lower ends of the plates 116, 118 abuts against the pin 132. The plate 118 is continuously swung with the lower cover 124 engaged at its one end by the pin 132. Therefore, the bent portion of the lower cover 124 is opened to allow a clearance gap to be formed between the plates 116, 118 which is wide enough to pass the sheet 154 therethrough. The exposed sheet 154 now falls and is caught by the roller pair 20.

After the sheet 154 has been discharged, the motor 162 continues its rotation until the plates 116, 118 return to the position of FIG. 5(A) in preparation for the insertion of a next sheet 154. The exposed sheet 154 is delivered to the read out unit 86 and then to the erase unit 96 in the manner described above.

FIGS. 6(A) through 6(F) illustrate still another embodiment of the device for feeding and positioning a recording medium according to the present invention. Identical reference numberals in FIGS. 6(A) through 6(F) denote identical compoents of the preceding embodiments.

The embodiment of FIGS. 6(A) through 6(F) employs a chain and sprocket and a coil spring. More specifically, a coil spring 170 has one end attached to a substantially central side edge of the plate 116, which has a guide member 172 attached to the lower end thereof. A rod 174 fixed to the lower end of the plate 116 is slidably disposed in the guide member 172. The plate 118 has a shaft 176 disposed on the upper end thereof and coupled to a chain (not shown) which can be displaced by a sprocket (not shown).

In operation, the plates 116, 118 are positioned closely to the exposure plane (not shown), and a radiation image is projected onto the sheet 154 gripped between the plates 116, 118. Then, the device enters a mode of operation for discharging the sheet 154. The shaft 176 is displaced to translate the plate 118, during which time the plate 116 is caused to swing to the position of FIG. 6(B) against the bias of the spring 170. At this time, the rod 174 slides in the guide member 172.

Figure 6A:
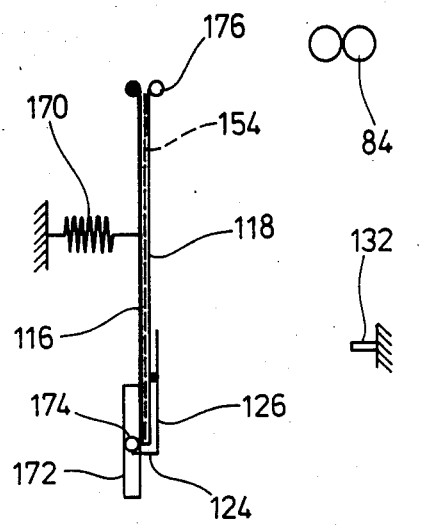
Figure 6B:
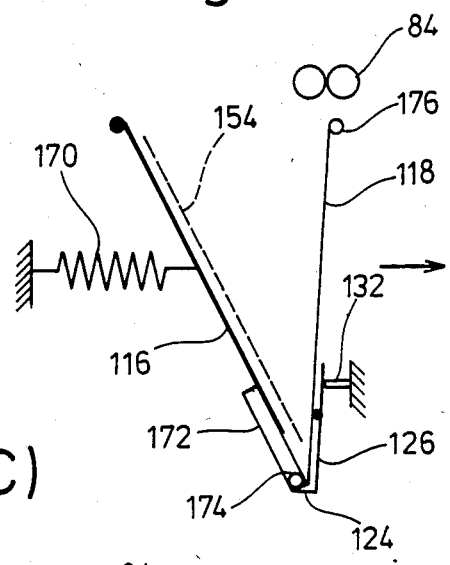
Figure 6C:
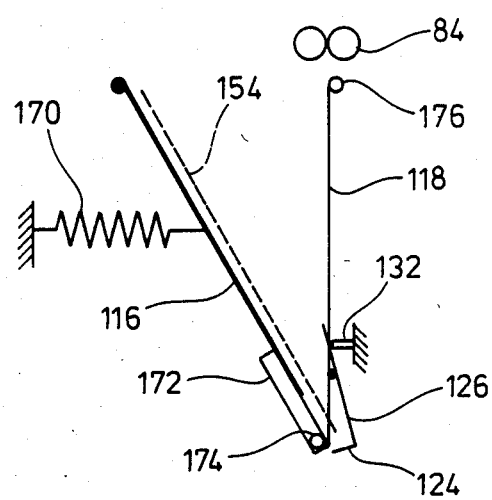

As the plate 118 is further displaced, the pin 132 abuts against the lower cover arm 126 (FIG. 6(C)), and the lower cover 124 having been in the closed position under the bias of the non-illustrated spring is opened to permit the exposed sheet 154 to fall (FIG. 6(D)). After the sheet 154 has been discharged, the coil spring 170 acts to move the plates 116, 118 to the position of FIG. 6(E). In this position, the lower cover 124 is returned to the closed position by the non-illustrated spring. A next sheet 154' is inserted in this position, and then the plates 116, 118 are moved back to the position of FIG. 6(F)) in readiness for a next cycle of exposure operation.

FIGS. 7(A) through 7(E) illustrate a still further embodiment of the device for feeding and positioning a recording medium according to the present invention. Identical reference numerals in FIGS. 7(A) through 7(E) denote identical compoents of the preceding embodiments.

A guide member 180 is disposed between the plates 116, 118 for guiding both side edge portions of the sheet 154, and a coil spring 182 acts between the plates 116, 118 for normally urging the plates 116, 118 in a direction to move toward each other.

Figure 7A:
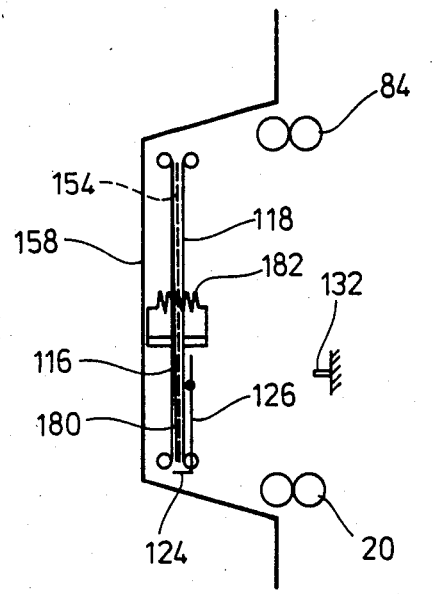
FIGS. 7(A) through 7(E) are schematic diagrams showing operation of a still further embodiment of the present invention.
Figure 7B:
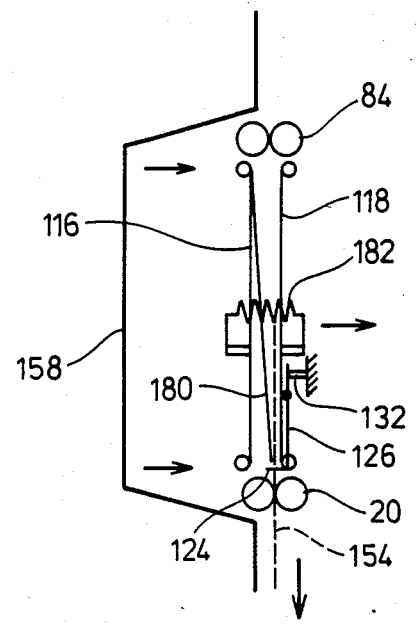
Figure 7C:
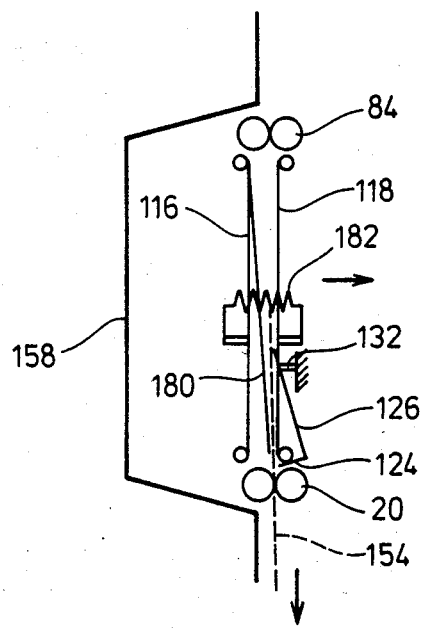
Figure 7D:
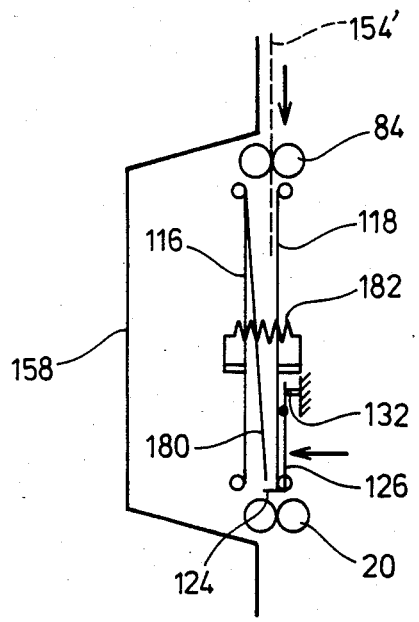
Figure 7E:
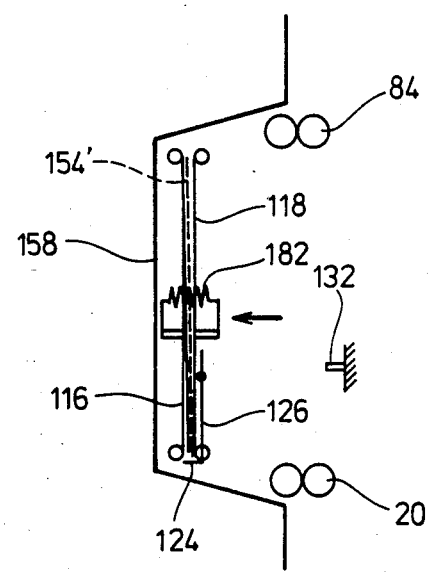

After the sheet 154 has been exposed (FIG. 7(A)), the first and second plates 116, 118 are moved away from the exposure plane 158 by a wire, a crank, or a parallel linkage (not shown) to the position of FIG. 7(B). Then, only the plate 118 is pulled away from the plate 116 against the resiliency of the coil spring 182. When the pin 132 abuts against the lower cover arm 126, the lower cover 124 is opened to allow the exposed sheet 154 to be discharged along the guide member 180, and the sheet 154 is delivered through the roller pair 20 slightly deviated inwardly out of vertical alignment with the roller pair 84 to a next process (FIG. 7(C)). At this time, the means such as a wire which has pulled the plate 116 away from the plate 118 is loosened to permit the plate 116 to return slightly toward the exposure plane 158 under the bias of the coil spring 182. The lower cover arm 126 is then disengaged from the pin 132 and returns to close the gap between the lower ends of the guide member 180 and the plate member 118 (FIG. 7(D)).

While the present invention has been described with the stimulable phosphor sheet used as the recording medium, an x-ray film may also be used as the recording medium. With such an alternative, intesifying screens should be provided on the first and second plates, respectively, of the grip member which grips the x-ray film for sandwiching the x-ray film on its both surfaces.

With the arrangement of the present invention, the recording medium can be brought as closely as possible to the exposure plane by the simple construction so that radiation image information of high accuracy can be produced. The device of the invention is reliable in operation since it employs a mechanical arrangement, and can easily be incorporated into the exposure unit.

Although certain preferred embodiments have been shown and described, it should be understood that many changes and modifications may be made therein without departing from the scope of the appended claims.

What is claimed is:

1. A device for feeding and positioning a recording medium, comprising:

(a) a grip member for gripping, feeding, and positioning the recording medium therein, said grip member comprising a first plate and a second plate, each plate having upper and lower ends, means for mounting said second plate in confronting relation to said first plate with a gap between the lower ends of said plates and for permitting relative movement of at least the upper end of said second plate with respect to the upper end of said first plate to allow the recording medium to enter between said plates, and a cover member moveably mounted adjacent the lower ends of said plate for closing and opening said gap between lower ends of said first and second plates; and (b) positioning means for holding said grip member with the upper ends of said plates opened in a recording medium receiving position, means for displacing said grip member after it has received the recording medium and closing the upper end portion thereof to thereby position said grip member to position the recording meduim in an exposure position in said grip member and for further displacing said grip member after the recording medium has been exposed from said exposure position and for opening said cover member for discharging the exposed recording medium out of said grip member through said gap.

2. A device according to claim 1, wherein said positioning means includes a pin member for opening said cover member, said pin member being positioned for abuttment against said cover member to open the cover member when said grip member is displaced from said exposure position.

3. A device according to claim 2, including a resilient member connected to said cover member for normally urging the cover member in a direction to close the gap between the lower ends of said first and second plates.

4. A device according to claim 1 or 3, wherein said first plate has an upper end portion mounted for rotation about a horizontal axis for displacement of said first plate between said recording medium receiving position and said exposure position by rotation about said upper end portion horizontal rotation axis.

5. A device according to claim 4, wherein said first and second plates are pivotably connected together at their lower ends, and said positioning means comprises a motor, and a crank mechanism operatively engaging said motor and connected to said second plate for displacing said second plate in response to rotation of said motor.

6. A device according to claim 5, further including a resilient member coupled to one of said plates for normally urging said one plate toward said exposure position.

7. A device according to claim 6, wherein said resilient member coupled to said one plate is also operably connected to said cover member.

8. A device according to claim 4, further including a resilient member coupled to one of said plates for normally urging said one plate toward said exposure position, and said positioning means comprises means for translating and angularly displacing said other plate while one plate is urged by said resilient member to said exposure position.

9. A device according to claim 8, wherein said second plate has a rod projecting from the lower end of said second plate, and said first plate has a guide member disposed at the lower end of said first plate and in sliding engagement with said rod.

10. A device according to claim 3, further including a resilient member coupled between said first and second plates for normally urging them toward each other and said positioning means comprising means for translating said grip member.

11. A device according to claim 10, including a guide member disposed between said first and second plates for engaging both side edge portions of the recording medium to guide the recording medium.

12. A device according to claim 1, wherein at least one of said plates has a recording medium confronting surface comprising a thin layer of foamed polyethylene.

13. A device according to claim 1, incorporated in a radiation image information recording and read out apparatus.

* * * * *